(12) United States Patent
Adler

(10) Patent No.: US 9,588,854 B2
(45) Date of Patent: Mar. 7, 2017

(54) SYSTEMS AND METHODS FOR A SECONDARY WEBSITE WITH MIRRORED CONTENT FOR AUTOMATIC FAILOVER

(71) Applicant: AOL Inc., Dulles, VA (US)

(72) Inventor: Michael R. Adler, Neptune City, NJ (US)

(73) Assignee: AOL Inc., Dulles, VA (US)

( * ) Notice: Subject to any disclaimer, the term of this patent is extended or adjusted under 35 U.S.C. 154(b) by 45 days.

(21) Appl. No.: 14/613,590

(22) Filed: Feb. 4, 2015

(65) Prior Publication Data

US 2015/0248337 A1 Sep. 3, 2015

Related U.S. Application Data

(60) Provisional application No. 61/946,359, filed on Feb. 28, 2014.

(51) Int. Cl.
*G06F 11/00* (2006.01)
*G06F 11/20* (2006.01)
*H04L 29/08* (2006.01)
*H04L 29/14* (2006.01)
*G06F 11/14* (2006.01)

(52) U.S. Cl.
CPC ...... *G06F 11/2069* (2013.01); *G06F 11/2023* (2013.01); *G06F 11/2038* (2013.01); *H04L 67/1034* (2013.01); *H04L 67/1095* (2013.01); *H04L 69/40* (2013.01); *G06F 11/1443* (2013.01); *G06F 11/2097* (2013.01); *H04L 67/02* (2013.01); *H04L 67/289* (2013.01)

(58) Field of Classification Search
USPC ........................................................ 714/4.11
See application file for complete search history.

(56) References Cited

U.S. PATENT DOCUMENTS

| 8,938,516 | B1* | 1/2015 | Thathapudi | H04L 12/4641 |
|  |  |  |  | 709/208 |
| 2010/0257409 | A1* | 10/2010 | Aranwela | G06F 17/3089 |
|  |  |  |  | 714/38.14 |
| 2012/0209942 | A1 | 8/2012 | Zehavi et al. |  |
| 2015/0169418 | A1* | 6/2015 | Cardona | G06F 11/2033 |
|  |  |  |  | 714/4.11 |

* cited by examiner

*Primary Examiner* — Sarai Butler
(74) *Attorney, Agent, or Firm* — Bookoff McAndrews, PLLC

(57) ABSTRACT

Systems and methods are disclosed for providing a secondary website with content mirrored from a primary website. One method includes accessing a generated primary website provided by one or more primary servers; generating a secondary website based on the generated primary website; storing the secondary website on a secondary server; and providing the secondary website from the secondary server when primary website is unavailable.

20 Claims, 6 Drawing Sheets

SYSTEMS AND METHODS FOR A SECONDARY WEBSITE WITH MIRRORED CONTENT FOR AUTOMATIC FAILOVER

CROSS-REFERENCE TO RELATED APPLICATIONS

This application claims the benefit of priority to U.S. Provisional Patent Application No. 61/946,359, entitled "Systems and Methods for a Secondary Website with Mirrored Content for Automatic Failover," filed on Feb. 28, 2014, which is incorporated herein by reference in its entirety.

TECHNICAL FIELD

Various embodiments of the present disclosure relate generally to a redundant or standby website used upon failure of the primary website. More specifically, particular embodiments of the present disclosure relate to systems and methods for a secondary website with content mirrored from a primary website during failover.

BACKGROUND

Companies, universities, governments, and other operators of large-scale network services implement many different types of architectures and methods to prevent and avoid downtime for websites. For example, these entities have used techniques such as content delivery networks ("CDNs"), global server load balancing ("GSLB"), route health injection, and/or expensive network device redundancy. Various embodiments of these technologies are sometimes referred to as "high availability," "high reliability," and "load balancing," any of which may typically involve techniques such as round robin DNS (domain name server) routing, scheduling algorithms, etc. All of these technologies are used to ensure that a website is consistently available, and that the website loads completely in an appropriate amount of time. However, when problems occur because of equipment failure, software failure, and/or due to the operational complexity of such a system, a website provided by a primary web server may become unavailable, load slowly, and/or provide a poor user experience.

One useful technique for providing a backup to a primary website involves mirroring (e.g., "duplicating") the primary physical hardware resources and software resources. However, this technique is costly and requires onerous work to integrate the backup solution with the primary software resources. Additionally, when using such a backup solution during failure of the primary resources, the backup website may contain stale content and/or the backup website may appear different on a user's web browser. To complicate matters further, when a failure occurs, the switching to the backup system may require manual intervention by an administrator of the system and/or the switching may occur slowly, thereby degrading a user's experience. In such a system, the backup website is unduly complicated out of necessity.

Accordingly, a need exists for systems and methods for an improved backup or secondary website that operates in a predictable and reliable manner. More specifically, a need exists for systems and methods for a backup or secondary website with content mirrored from a primary website that provides the content when the primary website is otherwise unavailable.

SUMMARY OF THE DISCLOSURE

According to certain embodiments, methods are disclosed for providing a secondary website with mirrored content from a primary website. One method includes: accessing a generated primary website provided by one or more primary servers; generating a secondary website based on the generated primary website; storing the secondary website on a secondary server; and providing the secondary website from the secondary server when primary website is unavailable.

According to certain embodiments, systems are disclosed for providing a secondary website with mirrored content from a primary website. One system includes a data storage device storing instructions for providing a secondary website with mirrored content from a primary website; and a processor configured to execute the instructions to perform a method including: accessing a generated primary website provided by one or more primary servers; generating a secondary website based on the generated primary website; storing the secondary website on a secondary server; and providing the secondary website from the secondary server when primary website is unavailable.

According to certain embodiments, a non-transitory computer readable medium is disclosed that stores instructions that, when executed by a computer, cause the computer to perform a method for providing a secondary website with mirrored content from a primary website. One computer-readable medium includes the method of accessing a generated primary website provided by one or more primary servers; generating a secondary website based on the generated primary website; storing the secondary website on a secondary server; and providing the secondary website from the secondary server when primary website is unavailable.

Additional objects and advantages of the disclosed embodiments will be set forth in part in the description that follows, and in part will be apparent from the description, or may be learned by practice of the disclosed embodiments. The objects and advantages of the disclosed embodiments will be realized and attained by means of the elements and combinations particularly pointed out in the appended claims.

It is to be understood that both the foregoing general description and the following detailed description are exemplary and explanatory only and are not restrictive of the disclosed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DESCRIPTION OF THE EMBODIMENTS

Reference will now be made in detail to the exemplary embodiments of the disclosure, examples of which are illustrated in the accompanying drawings. Wherever possible, the same reference numbers will be used throughout the drawings to refer to the same or like parts.

A website is provided by a content provider through a Uniform Resource Locator ("URL") or an Internet Protocol ("IP") address that provides a location or an address for one or more servers on which a website resides. The website may be distributed by the one or more servers of the content provider. A content delivery network ("CDN") is a collection of servers located across the Internet. CDN providers provide infrastructure (e.g., a network of proxy servers) to content providers to achieve timely and reliable delivery of content over the Internet. The CDN's proxy servers typically cache, or store, frequently accessed content of the content provider, and then locally fulfill successive requests for the same content, eliminating repetitive transmission of identical content over network links. A user, such as individuals, businesses, or governments, uses personal computers or communication devices, such as smart phones, to access content over a CDN, which is originally provided by content providers from the one or more primary servers.

The Internet allows clients, such as web browsers on a user's machine, to use HTTP (Hyper Text Transport Protocol) to request websites from servers. The server processes the request and sends a response back to the client. HTTP is built on a client-server model in which a client accesses the content of the server.

A CDN is used to deliver content, such as websites, streaming media, and applications, to the client running on a user's computer. The CDN includes distributed content delivery nodes that are arranged for efficient delivery of content on behalf of the content providers. A request from a client for content is directed from the computer of the user to the Internet through a "point of presence," such as an Internet Service Provider (ISP), and hence to a server of the CDN (rather than being sent to the server of the content provider itself). Such routing minimizes the response time for data requests and provides high quality bandwidth. Also, such networks provide more efficient and cost-effective distribution to the computers of users.

CDNs will usually cache the content of the content provider's server locally. If a request for content that has not been cached, it generally will go directly to a primary server to retrieve the content. A proxy, sometimes referred to as a proxy server, acts as both a server and a client for the purpose of making requests on behalf of other clients. In this manner, the overhead required within a CDN to deliver cacheable content is minimized. Persons skilled in the art will also know the processes CDNs use to generate and deliver cached content.

Figure 1:
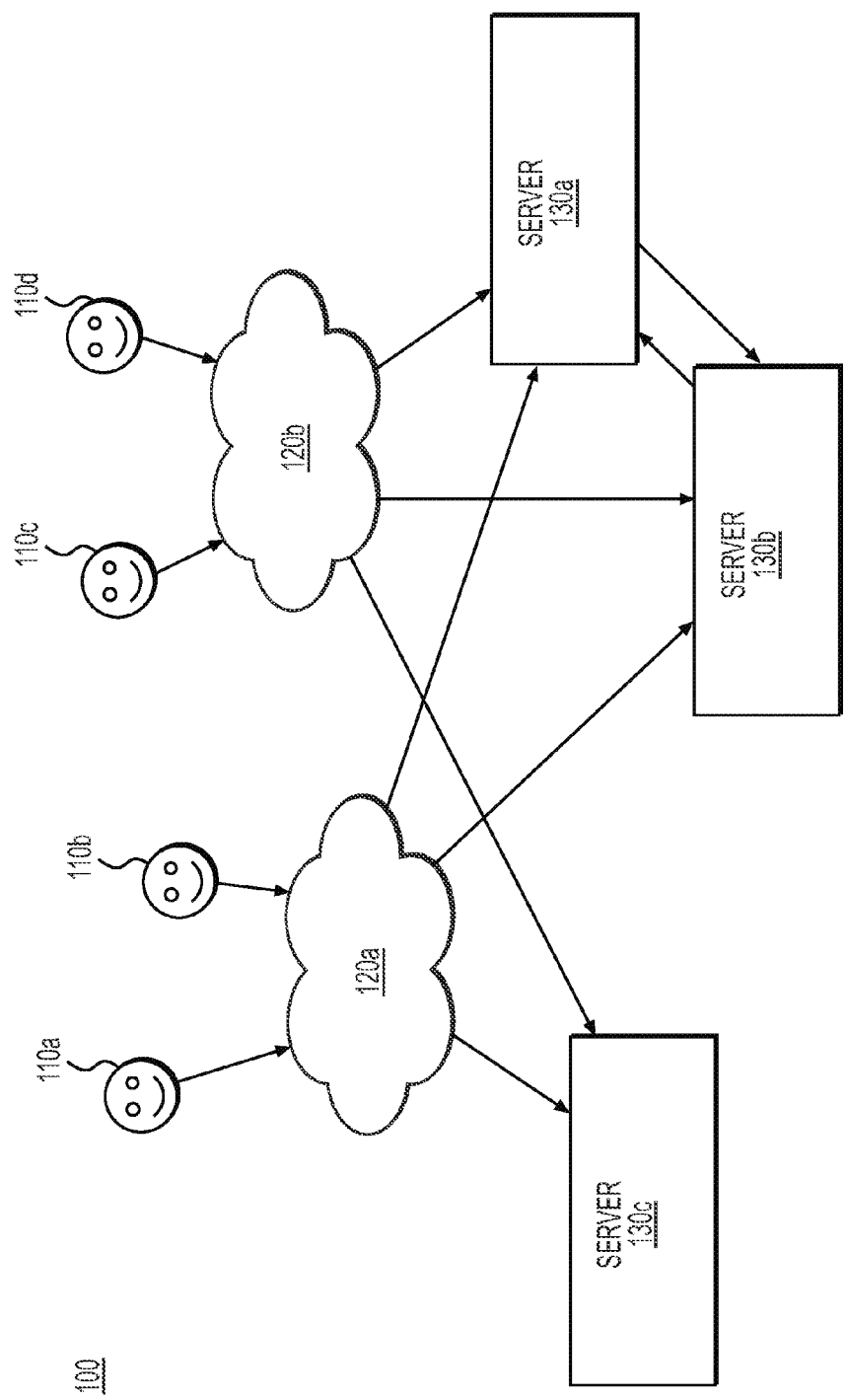
FIG. 1 is a diagram of a system and environment in which clients access the content of websites on servers through the use of a content delivery network.

FIG. 1 is a schematic diagram of a system and environment 100 in which clients 110a, 110b, 110c, and 110d access the content of websites on servers 130a, 130b, and 130c through the use of CDN 120a and/or CDN 120b. The client, such as one of client devices 110a, 110b, 110c, and 110d, requests a website. The CDN 120a or CDN 120b will then directly provide the content or access the content on one or more of the servers 130a or 130b on behalf of the client during normal operation. When one or both of the servers 130a or 130b is unavailable or not responding quickly, the CDN 120a and CDN 120b may attempt to access a backup server 130c to deliver content of the website.

This system requires a backup server with hardware and software similar to the primary servers. Further, the system requires the backup server to be in constant communication with the primary servers to ensure up-to-date back-up copies. If one or more of the primary servers becomes unavailable the backup server may have to access other available primary servers, which can slow website request because the servers may not be centrally located.

Figure 2:
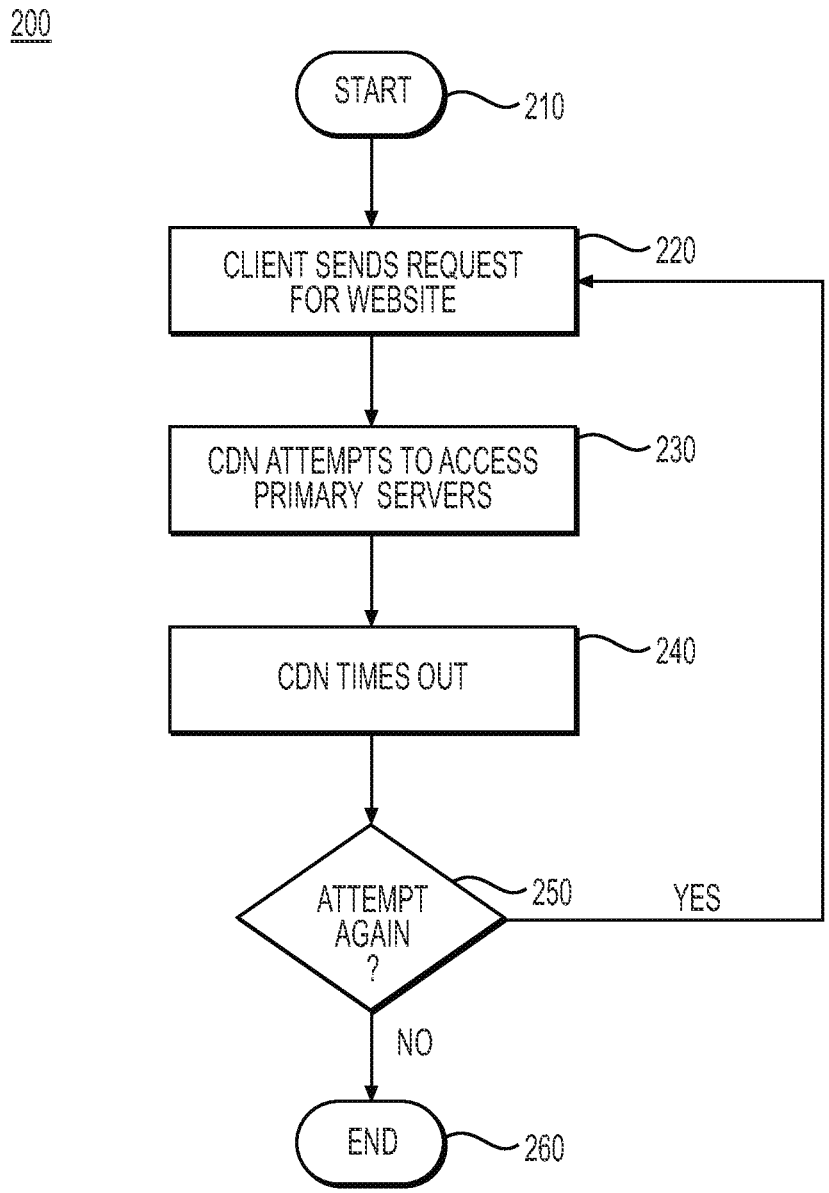
FIG. 2 is a flow diagram of a method in which servers use techniques of providing content through a content delivery network.

FIG. 2 is a flow diagram of a method in which servers, such as servers 130a, 130b, and 130c, practice techniques of providing content. The method begins with the one or more primary servers being unavailable or extremely slow at step 210. At step 220, a client will attempt to connect to a website provided by the servers through a CDN. The CDN will attempt to connect to the unavailable or slow servers at step 230. After a period of time, the CDN will timeout and not provide the website requested by the client at step 240. Then the method will then determine at step 250 whether the client has requested another attempt to connect and proceed to step 220. If it is determined that another attempt has not been requested, the method will proceed to step 260 and end.

Figure 3:
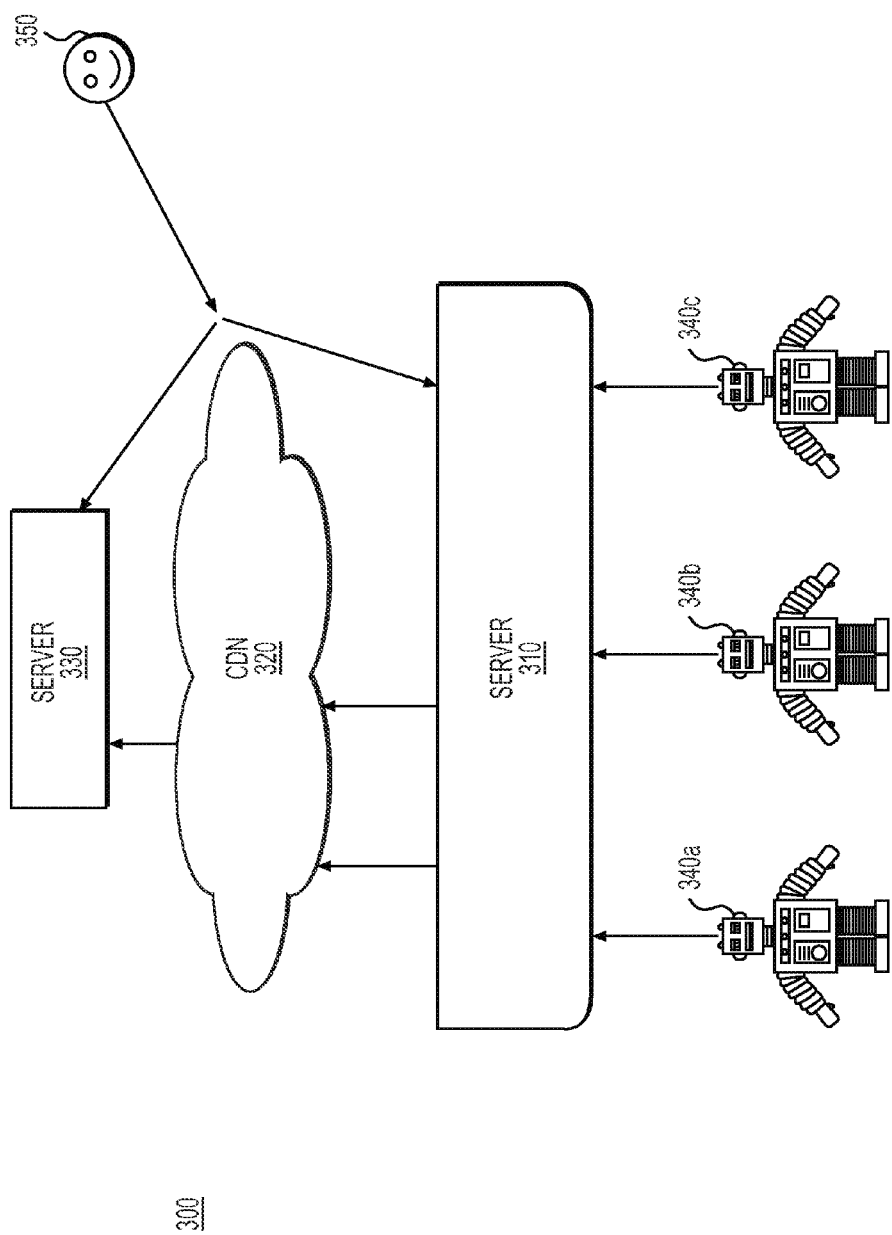
FIG. 3 is a schematic diagram of an exemplary system and environment in which a secondary or backup server maintains a backup copy of a primary server and provides content when the primary server is unavailable, according to an exemplary embodiment of the present disclosure.

FIG. 3 depicts a proposed embodiment of a secondary or backup server for an embodiment of the present disclosure. A secondary server 310 is provided. The secondary server can be a web application accelerator server, which is also known as a "caching HTTP reverse proxy server" or a "reverse proxy server." Reverse proxy servers appear to a client to be equivalent to a web server, and no special configuration is required for the client. In this manner, a client can make requests for content, and the reverse proxy returns the content as if it were the primary server.

The secondary server 310 is connected to a CDN 320, which connect connects to primary servers 330. One or more agents 340 send requests through the secondary server 310 and then through the CDN 320 for content provided by the one or more primary servers 330. One or more secondary servers 310 generate cached copies of the websites provided by one or more primary servers 330. The websites may include dynamically generated websites that access multiple primary servers in order to provide the content of the website, or may include static websites that are stored at a single location on one or more primary servers. Thus, clients 350 may access the cached copies of the website on secondary servers 310 or the content of the website on the primary servers 330 through the use of a CDN, such as CDN 320, without knowing which server the client 350 has received the content from.

Once the secondary server 310 has been provided content from the primary servers 330, the secondary server 310 may provide the content of the primary server at an accelerated rate when the primary server is unavailable. The secondary server 310 may be any type of server. More specifically, the secondary server 310 may be a reverse proxy server. From the point of view of client 350, the reverse proxy server is the primary server.

A benefit of using a reverse proxy server as a secondary server 310 is that it allows for the easy replacement of primary servers 330, when the primary servers are unavailable. The CDN 320 will be able to provide content from the secondary sever 310 when primary server 330 becomes unavailable by automatically diverting content requests from primary servers 330 to secondary server 310. With a reverse proxy server, a client will not be able to tell that a primary server is unavailable because the reverse proxy server has already mapped and created backup copies of websites hosted by the primary servers 330. Further, it is a relatively cost efficient easy process to setup a reverse proxy server to act as the primary server during failover by changing one or more settings in CDN 320.

Another benefit of operating a reverse proxy server as a secondary server is the ability to assimilate and store various content and applications running on many different primary servers on a single secondary server. A reverse proxy server, such as secondary sever 310, works by having agents, such as agents 340, act as clients. These agents send an HTTP GET request to the secondary server 310 (reverse proxy server). The reverse proxy server receives the request and checks the prefix URL against its mapping (already stored websites). If the reverse proxy server finds that the request needs to be forwarded to a primary server because it does not have a copy of the website in its mapping, the reverse proxy server accesses the primary web server by forwarding the request to the primary server 330 through the CDN 320. The primary server processes the request by accessing one or more of a content server, an advertisement server, and/or an image server, and dynamically generating a primary website. The primary server will then return the generated website to a secondary server where it is mapped and stored on the secondary server, and then the secondary server forwards the request to the requestor (agent 350). After the HTTP GET request has been mapped, the reverse proxy server can forward all similar HTTP GET requests to the copy of the website mapped on the reverse proxy server (secondary server 310). The requestor will not be able to tell whether the primary server or the secondary server provided the website.

Figure 4:
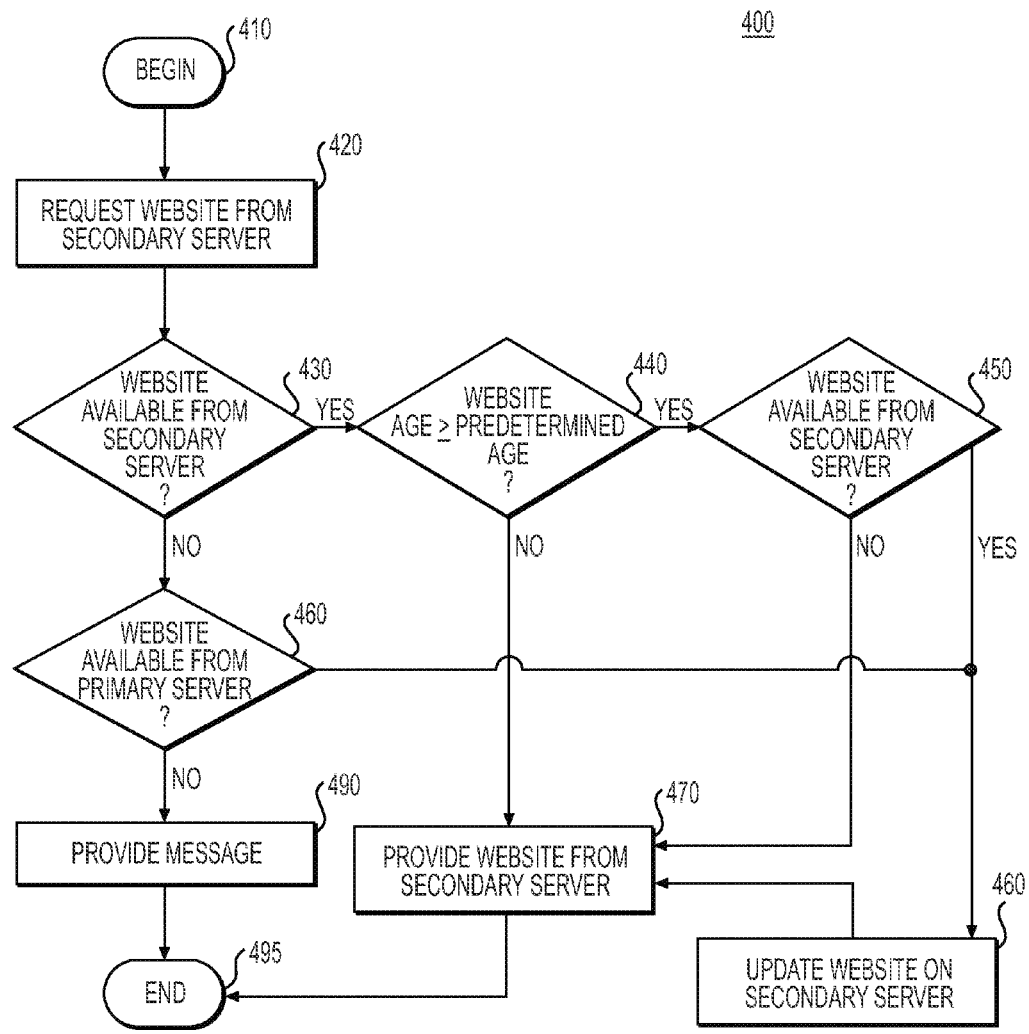
FIG. 4 is a flow diagram of an exemplary method in which a secondary or backup server maintains and updates a backup copy of a primary server, according to an exemplary embodiment of the present disclosure.

FIG. 4 is a flow diagram of a proposed embodiment of the present disclosure for populating the secondary server with content of the primary server. At step 410, the secondary server is connected to the primary server through a communications network, such as the Internet, and a CDN. Once the secondary server is connected to the primary server, a request for a website is made to the secondary server by an agent, such as agent 340, at step 420.

The method then proceeds to step 430 where it is determined whether the website requested in step 420 is available from the secondary server. If the website is not available from the secondary server, the method proceeds to step 480. If the website is available from the secondary server, the secondary server at step 440 determines whether an age of a cached copy of the website on the secondary server is greater than or equal to a predetermined age. If the cached copy is greater than a predetermined age, the method proceeds to step 450. If the website is not greater than or equal to the predetermined age, the method proceeds to step 470.

At step 450, the secondary server determines whether the website is available from the primary server. If the website is not available from the primary server, then the method proceeds to step 470, where the website provided from the secondary server. If the website is available from the primary server, then the method proceeds to step 460 where the cached copy of the website on the secondary server is updated. The cached copy is updated by accessing the dynamically generated website on the primary server, as discussed above. Once the cached copy of the website on the secondary server is updated, the method proceeds to step 470. At step 470, the secondary server provides the cached copy of the website to the requestor, and then the method proceeds to step 495, where the method ends.

When the cached copy of the website is determined to not be available at step 430, the method at step 480 determines whether the website is available from the primary server. If the website is not available, the method proceeds to step 490 where a message or warning is provided that the website is unavailable. The method then proceeds to step 495 and ends. If the website is available from the primary server, the method proceeds to step 460, as discussed above.

The secondary server 310 allows for efficient serving of requests and does not require significant computer resources to stand idle. The secondary server stores websites in a simple manner. For example, websites can be stored as a single component rather than requiring the accessing of one or more of a web page server, a database, cache, an advertisement server, etc. Populating the secondary server 310 can be straightforward, as described above, and can be done by users or bots. Further, the secondary server may present normalized URLs by not requiring extensive URL addresses like typical backup servers require.

The agents 340 direct secondary server 310 to access primary servers 330. Agents 340 may be users of client devices, such a web browsers running on a computer, or may be bots running web browsers. The agents 340 crawl web pages on the website provided by the primary server 330. The agents 340 may also be given a URL or IP address of a targeted website provided by a primary server, or it may be given a list of URLs and IP addresses to visit. These URLs and IP addresses are typically referred to as "seeds." As the agent 340 visits these URLs and/or IP addresses, the agent 340 identifies all the hyperlinks in the page and adds them to the list of URLs and IP addresses to visit. These lists of URLs and IP addresses are recursively visited according to a set of policies.

Since websites may include a large volume of web pages, the agents 340 may prioritize the web pages that it visits on the website and downloads. Further, the website may have a high rate of change, which requires the agents 340 to update or even delete downloaded content from the website.

The agent 340 may automatically navigate web pages on the website provided by the primary server 330, extract information from the website, and store the information in the secondary server 310. In some embodiments, the agent 340 extracts text, captures images, processes links, or triggers an event associated with a web page of the website. The agent 340 is also able to extract asynchronous javascript and XML ("AJAX") request on web pages of the website to include in the mirrored content. For example, the agent 340, by using a web browser can load a web page that contains AJAX code, which calls for images to load page. The agent 340 would be able to extract the contents of the web page and the images called by the AJAX code.

A user may configure agents 340 to extract all information from a web page of a website, some information from a web page of a website, or to not extract any information. A web page of a website may comprise one or more elements. Elements are content that can be found in web pages of a website including text, pictures, forms, buttons, links, embedded objects, media, advertisements, comments etc. For example, a web page may comprise some text, an image, and a comments section. In one embodiments, an agent 340 may be configured to ignore the comments section when crawling web pages of the website, as these elements require access to other primary servers. In another embodiment, agent 340 may process a link on a web page of a website and download the content of the link, referred to as a "sub page" of the web page. Agent 340 may then be configured crawl the sub page.

The agents 340 may use an actual web browser to extract content from the website, and may specify a type of user-agent that it is, such as a web browser type or a bot. The agents 340 may identify themselves as bots to allow websites to be programmed to act in a certain way when it detects the bot. Further, agents, by identifying themselves, may be prevented from accessing the website when the server is overloading or unavailable. Thus, it may be possible for the agents 340 to activate the secondary server to provide websites.

Figure 5:
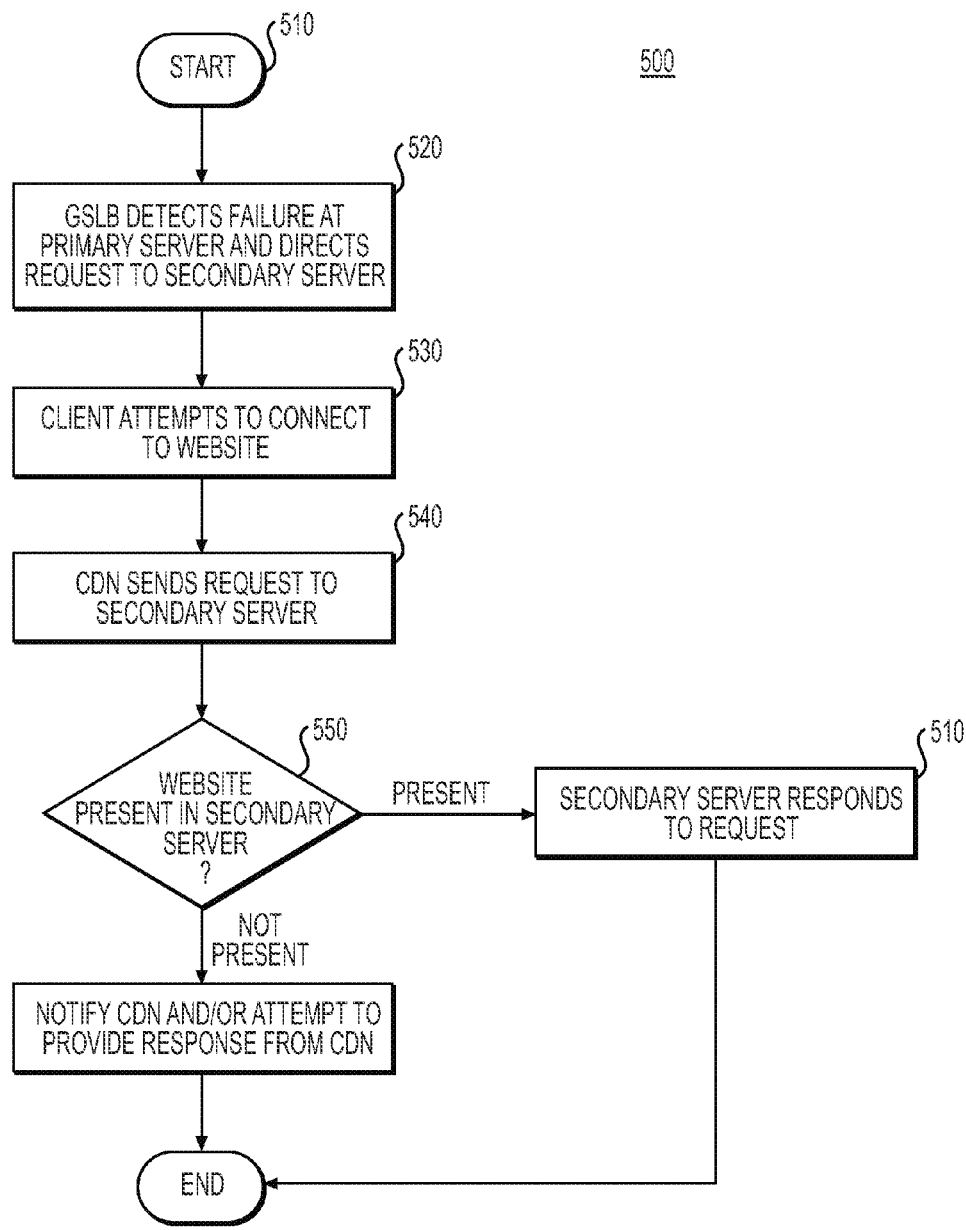
FIG. 5 is a flow diagram of an exemplary method in which a content delivery network uses a secondary server to provide content when a primary server is unavailable, according to an exemplary embodiment of the present disclosure.

FIG. 5 is a flow diagram of a method 500 of an embodiment of the present disclosure in which servers, such as servers 310 and 330, provide content. The method begins with the one or more primary servers being unavailable or extremely slow at step 510. At step 520, a global server load balancer ("GSLB") detects the failure of one or more primary servers, and directs requests to secondary server. At step 530, a client will attempt to connect to a website provided by the servers through a CDN. At step 540, the CDN will send a request to the secondary web server. The secondary web server at step 550 will determine whether the website is present in its cache. If the website is present, the method proceeds to step 560 where the secondary server sends the requested website to the client, and ends at step 580. If the website is not present as determined in step 550, the CDN at step 570 will be notified that the website is not present in the secondary server and may attempt to provide the website from CDN cache. The method then proceeds to step 580 and ends.

Any of clients 110 and/or 350, agents 340, and/or servers 130, 310, and/or 330 may include any type or combination of computing systems, such as handheld devices, personal computers, servers, clustered computing machines, and/or cloud computing systems. In one embodiment, clients 110 and/or 350, agents 340, and/or servers 130, 310, and/or 330 may be an assembly of hardware, including a memory, a central processing unit ("CPU"), and/or optionally a user interface. The memory may include any type of RAM or ROM embodied in a physical storage medium, such as magnetic storage including floppy disk, hard disk, or magnetic tape; semiconductor storage such as solid state disk ("SSD") or flash memory; optical disc storage; or magneto-optical disc storage. The CPU may include one or more processors for processing data according to instructions stored in the memory. The functions of the processor may be provided by a single dedicated processor or by a plurality of processors. Moreover, the processor may include, without limitation, digital signal processor ("DSP") hardware, or any other hardware capable of executing software. The user interface may include any type or combination of input/output devices, such as a display monitor, touchpad, touchscreen, microphone, camera, keyboard, and/or mouse.

Figure 6:
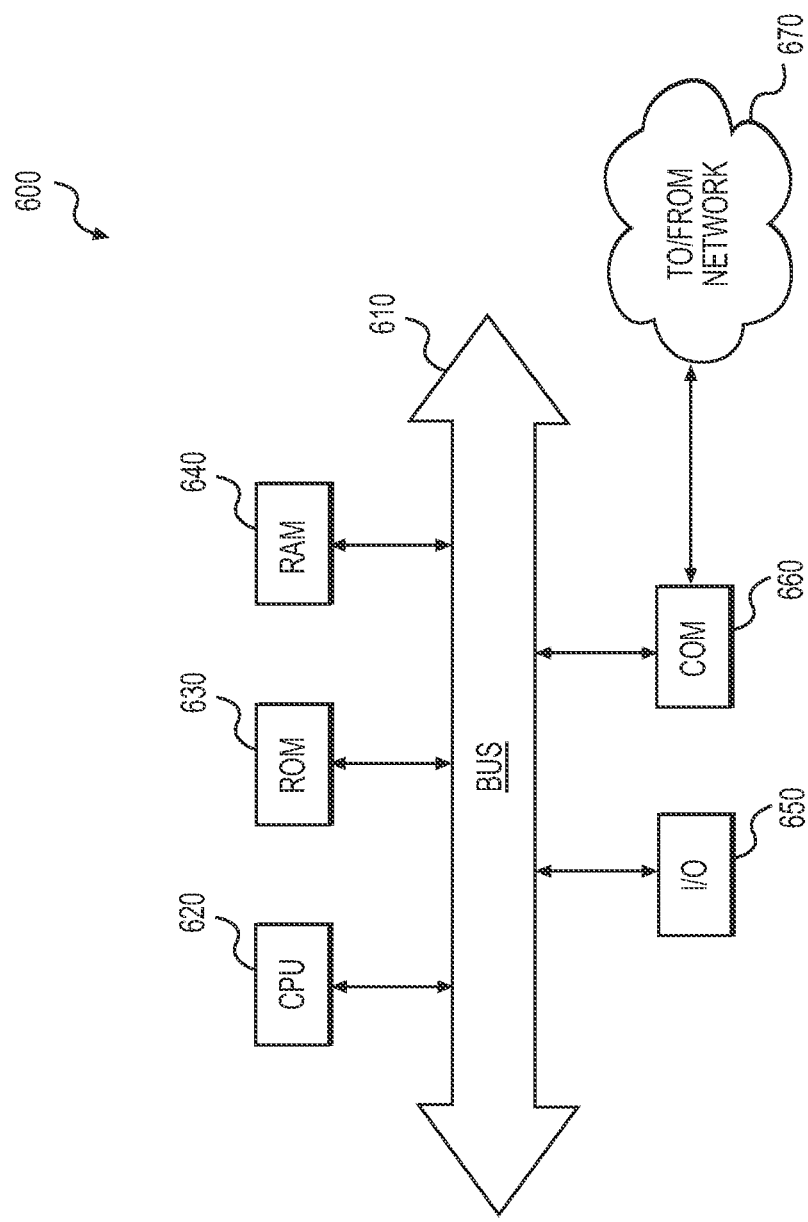
FIG. 6 is a simplified functional block diagram of a computer that may be configured as a device or server for executing the methods of FIGS. 2, 4, and 5, according to exemplary embodiments of the present disclosure.

FIG. 6 is a simplified functional block diagram of a computer that may be configured as a client, agent, or server for executing the methods of FIGS. 2, 4, and 5, according to exemplary embodiments of the present disclosure. Specifically, in one embodiment, as shown in FIG. 6, any of clients, agents, and/or servers 212, 220 may be an assembly of hardware 600 including, for example, a data communication interface 660 for packet data communication. The platform may also include a central processing unit ("CPU") 620, in the form of one or more processors, for executing program instructions. The platform typically includes an internal communication bus 610, program storage, and data storage for various data files to be processed and/or communicated by the platform such as ROM 630 and RAM 640, although the system 600 often receives programming and data via network communications 670. The server 600 also may include input and output ports 650 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the mobile communication network into the computer platform of a server and/or from a server to the mobile device. Thus, another type of media that may bear the software elements includes optical, electrical and electromagnetic waves, such as used across physical interfaces between local devices, through wired and optical landline networks and over various airlinks. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

While the presently disclosed sharing application, methods, devices, and systems are described with exemplary reference to mobile applications and to transmitting HTTP data, it should be appreciated that the presently disclosed embodiments may be applicable to any environment, such as a desktop or laptop computer, an automobile entertainment system, a home entertainment system, etc. Also, the presently disclosed embodiments may be applicable to any type of Internet protocol that is equivalent or successor to HTTP.

Other embodiments of the disclosure will be apparent to those skilled in the art from consideration of the specification and practice of the invention disclosed herein. It is intended that the specification and examples be considered as exemplary only, with a true scope and spirit of the invention being indicated by the following claims.

What is claimed is:
1. A method for providing a secondary website with content mirrored from a primary website, the method including:
accessing a dynamically generated primary website provided by one or more primary servers by using an agent that specifies a type of user-agent including at least one of a web browser type or a bot;

generating a static secondary website based on the dynamically generated primary website that is accessed by using the agent;

storing the static secondary website on a secondary server;

determining when the dynamically generated primary website is unavailable; and providing the static secondary website from the secondary server when the dynamically generated primary website is unavailable.

2. The method of claim 1, further comprising:

updating the stored static secondary website on the secondary server.

3. The method of claim 2, wherein updating the stored static secondary website on the secondary server includes:

accessing the dynamically generated primary website provided by one or more primary servers by using that agent that specifies the type of user-agent including at least one of the web browser type or the bot;

generating an updated static secondary website based on the dynamically generated primary website that is accessed by using the agent; and storing the updated static secondary website on the secondary server.

4. The method of claim 1, wherein the accessing the dynamically generated primary website includes:

accessing a content server; and accessing an advertisement server.

5. The method of claim 4, wherein accessing the dynamically generated primary website further includes:

accessing an image server.

6. The method of claim 1, wherein the static secondary website is a near visual copy of the dynamically generated primary website.

7. The method of claim 1, wherein the agent is a bot that uses a web browser to obtain a near visual copy of the dynamically generated primary web page.

8. A system for providing a secondary website with content mirrored from a primary website, the system including:

a data storage device storing instructions for providing a secondary website with mirrored content from a primary website; and a processor configured to execute the instructions to perform a method including:

accessing a dynamically generated primary website provided by one or more primary servers by using an agent that specifies a type of user-agent including at least one of a web browser type or a bot;

generating a static secondary website based on the dynamically generated primary website that is accessed by using the agent;

storing the static secondary website on a secondary server;

determining when the dynamically generated primary website is unavailable; and providing the static secondary website from the secondary server when the dynamically generated primary website is unavailable.

9. The system of claim 8, wherein the processor is further configured to execute the instructions to perform the method including:

updating the stored static secondary website on the secondary server.

10. The system of claim 9, wherein updating the stored static secondary website on the secondary server includes:

accessing the dynamically generated primary website provided by one or more primary servers by using that agent that specifies the type of user-agent including at least one of the web browser type or the bot;

generating an updated static secondary website based on the dynamically generated primary website that is accessed by using the agent; and storing the updated static secondary website on the secondary server.

11. The system of claim 8, wherein accessing the dynamically generated primary website includes:

accessing a content server; and accessing an advertisement server.

12. The system of claim 11, wherein the accessing the dynamically generated primary website further includes:

accessing an image server.

13. The system of claim 8, wherein the static secondary website is a near visual copy of the dynamically generated primary website.

14. The system of claim 8, wherein the agent is a bot that uses a web browser to obtain a near visual copy of the dynamically generated primary web page.

15. A non-transitory computer-readable medium storing instructions that, when executed by a computer, cause the computer to perform a method for providing a secondary website with content mirrored from a primary website, the method including:

accessing a dynamically generated primary website provided by one or more primary servers by using an agent that specifies a type of user-agent including at least one of a web browser type or a bot;

generating a static secondary website based on the dynamically generated primary website that is accessed by using the agent;

storing the static secondary website on a secondary server;

determining when the dynamically generated primary website is unavailable; and providing the static secondary website from the secondary server when the dynamically generated primary website is unavailable.

16. The computer-readable medium of claim 15, further comprising:

updating the stored static secondary website on the secondary server.

17. The computer-readable medium of claim 16, wherein updating the stored static secondary website on the secondary server includes:

accessing the dynamically generated primary website provided by one or more primary servers by using that agent that specifies the type of user-agent including at least one of the web browser type or the bot;

generating an updated static secondary website based on the dynamically generated primary website that is accessed by using the agent; and storing the updated static secondary website on the secondary server.

18. The computer-readable medium of claim 15, wherein the accessing the dynamically generated primary website includes:

accessing a content server; and accessing an advertisement server.

19. The computer-readable medium of claim 18, wherein accessing the dynamically generated primary website further includes:

accessing an image server.

20. The computer-readable medium of claim 15, wherein the static secondary website is a near visual copy of the dynamically generated primary website.

\* \* \* \* \*